US012687184B2

(12) United States Patent
Bueter

(10) Patent No.: US 12,687,184 B2
(45) Date of Patent: Jul. 21, 2026

(54) WORKING CYLINDER

(71) Applicant: Bümach Engineering International B. V., TA Emmen (NL)

(72) Inventor: Josef Bueter, Haren/Altenberge (DE)

(73) Assignee: Bümach Engineering International B.V., TA Emmen (NL)

( * ) Notice: Subject to any disclaimer, the term of this patent is extended or adjusted under 35 U.S.C. 154(b) by 0 days.

(21) Appl. No.: 18/717,015

(22) PCT Filed: Dec. 10, 2021

(86) PCT No.: PCT/DE2021/000198
§ 371 (c)(1),
(2) Date: Jun. 6, 2024

(87) PCT Pub. No.: WO2023/104228
PCT Pub. Date: Jun. 15, 2023

(65) Prior Publication Data
US 2025/0035136 A1 Jan. 30, 2025

(51) Int. Cl.
*F15B 15/14* (2006.01)

(52) U.S. Cl.
CPC ................................ *F15B 15/1428* (2013.01)

(58) Field of Classification Search
CPC ......................... F15B 15/1438; F15B 15/1428
See application file for complete search history.

(56) References Cited

U.S. PATENT DOCUMENTS

| | | | | |
|---|---|---|---|---|
| 4,187,766 A * | 2/1980 | Gaylord | .................. | F16J 10/02 228/136 |
| 2007/0012174 A1 | 1/2007 | Fish | | |
| 2010/0022317 A1 | 1/2010 | Burgbacher et al. | | |

FOREIGN PATENT DOCUMENTS

| | | | | |
|---|---|---|---|---|
| DE | 2916457 A1 | 12/1979 | | |
| DE | 8716060 U1 | 4/1989 | | |
| DE | 202012008320 U1 * | 1/2014 | ........... | B23K 26/282 |
| DE | 102015210078 A1 | 12/2016 | | |
| DE | 202019004569 U1 * | 3/2021 | ............. | B23K 26/28 |
| DE | 102019007754 A1 * | 5/2021 | ........... | B23K 26/282 |
| JP | S6316559 U | 2/1988 | | |
| JP | 2623650 B2 | 6/1997 | | |

* cited by examiner

*Primary Examiner* — Nathaniel E Wiehe
*Assistant Examiner* — Daniel S Collins
(74) *Attorney, Agent, or Firm* — Laurence A. Greenberg; Werner H. Stemer; Ralph E. Locher

(57) ABSTRACT

A working cylinder has a cylinder tube, a closure part and a further closure part disposed at cylinder tube ends. The closure part has a shaft portion and the cylinder tube has a cylinder tube end portion. The shaft portion and the cylinder tube end portion define a coupling portion where the shaft portion is axially inserted into the cylinder tube at the cylinder tube end portion. The shaft portion has a taper and is oversized, at least in part, relative to an inner diameter of the cylinder tube. The cylinder tube has an elastic circumferential expansion there. The coupling portion is constructed to axially couple the closure part and the cylinder tube. The cylinder tube end is bonded to the closure part by a circumferential annular weld seam that defines a sealing plane.

8 Claims, 5 Drawing Sheets

WORKING CYLINDER

FIELD AND BACKGROUND OF THE INVENTION

The invention relates to a working cylinder, in particular a hydraulic working cylinder, and to a method for its production.

Working cylinders as such are known from the prior art. Usually, these working cylinders have a cylinder tube and closure parts.

According to the state of the art, such working cylinders are produced, for example, by screwing the closure parts and the cylinder tube together. Such working cylinders are also known as screw-type cylinders.

Moreover, it is known from the state of the art to connect the base closure part to the cylinder tube by MAG welding and then only to screw the guide closure part.

Normally, the threads of the cylinder tube and closure parts are produced in a machining process.

Both screw-type cylinders and cylinders with screwing only one closure part and MAG welding of the other closure part are provided in high quality according to the state of the art and have proven to be top-quality and reliable products.

The threads of the cylinder tube and closure parts are usually produced by a shape-cutting operation.

Concerning production, it is disadvantageous that the tube wall thickness of the cylinder tube must be increased for the thread to be inserted subtractively because the thread inevitably weakens the cylinder tube in the area of the thread. Therefore, a tube wall thickness must be provided that is considerably overdimensioned to be capable to absorb the forces during operation, in particular the forces caused by the operating pressure of the fluid. The disadvantage of this solution is an increased material consumption and an increased final weight of the working cylinder. In terms of production it is furthermore difficult to match the threads of the closure parts and the cylinder tube to each other in such a manner that, if a desired special angular position of the closure parts relative to each other or to the cylinder tube is desired, an appropriate tightening torque is applied during screwing.

WO 2021/089069 A1 describes a solution that overcomes numerous disadvantages of the prior art. This solution discloses a working cylinder in which both closure parts are coupled to the cylinder tube by a circumferential laser weld seam. This solution is challenging in terms of production in that, on the one hand, the laser weld seam must have a sufficiently strong dimension to be capable to absorb the forces between the cylinder tube and the relevant closure part even at full operating pressure and, on the other hand, the energy input per length during welding must be low enough so as not to cause too much thermal load for thermally sensitive components such as seals or guides.

SUMMARY OF THE INVENTION

The task of the invention is to provide a working cylinder which is very reliable, can be produced in a cost-effective manner and has a high load capacity.

The task is solved by the features specified in the independent claim. Preferred embodiments result from the dependent claims.

The working cylinder according to the invention has a cylinder and a piston unit as basic elements and is particularly characterized by a special coupling section.

The cylinder of the working cylinder according to the invention has a cylinder tube, a closure part and a further closure part.

As is known per se, the cylinder tube has a cylinder tube end and a further cylinder tube end and thus two opposing cylinder tube ends. The closure part is arranged at the cylinder tube end, and the further closure part is arranged at the further cylinder tube end. In the following, the cylinder tube end and the further cylinder tube end are collectively also referred to as the cylinder tube ends, and the closure part and the further closure part are collectively also referred to as the closure parts. The cylinder tube and the closure parts arranged thereon form a cylinder interior.

The piston unit forms at least one working chamber in the cylinder interior. Preferably, the piston unit is designed as an assembly of piston and piston rod, wherein the piston rod passes in a sliding manner through one of the closure parts, which is the guide closure part then. However, the piston unit can also be provided, for example, as a plunger piston or as a piston unit of a cylinder which has a continuous piston rod and thus two equally large effective surfaces for extending and retracting.

The working cylinder according to the invention is also characterized by a specially designed coupling section.

According to the invention, the coupling section comprises the closure part, the cylinder tube end and a ring weld seam provided there. The cylinder tube and the closure part are collectively also referred to as the coupling partners.

In the area of the coupling section, the closure part has a shaft portion and the cylinder tube has a cylinder tube end portion. The shaft portion and the cylinder tube end portion together form the coupling section.

The coupling section has a proximal zone and a distal zone. The proximal zone and the distal zone directly adjoin each other in the axial direction. In this context, the proximal direction and position indications are understood to specify the direction and position pointing towards the center of the working cylinder, and the distal direction and position indications are understood to specify the opposite direction and position, i.e. the direction pointing away from the center of the working cylinder.

According to the invention, in the coupling section the closure part is axially inserted with its shaft portion into the cylinder tube in its cylinder tube end portion. Thus, the cylinder tube end portion encloses the shaft portion like a sleeve.

According to the invention, the shaft portion has a tapered design. Furthermore, the shaft portion is overdimensioned, at least in part, relative to the inner diameter of the cylinder tube. The overdimension correlates with the conicity. It is greatest in the area of the thickened section of the conicity and decreases in the direction of the tapered section of the conicity. It is also possible that the overdimension does not extend over the entire axial area and, in particular, that there is not any conicity in axial portions of the tapered section.

According to the invention, the cylinder tube end is connected to the closure part in a positive-substance manner by means of a circumferential ring weld seam. The ring weld seam is designed as a laser ring weld seam. The laser ring weld seam also forms a pressure-tight sealing plane. The ring weld seam can be provided radially, axially or even inclined relative to the main longitudinal axis. The circumferential ring weld seam serves to create a positive-substance and pressure-tight connection of the two joining partners with respect to the pressure medium and, preferably, to absorb the peak load during operation.

According to a particularly preferred aspect of the invention, the shaft portion has a distally reducing conicity. A distally reducing conicity is understood to mean that the outer diameter of the shaft portion, hereinafter referred to as the shaft outer diameter, decreases in an axially eccentric direction. Thus, the shaft portion is inserted into the cylinder tube end portion with its part having the larger outer diameter being ahead. The conicity is preferably provided in such a manner that the shaft portion represents a lateral surface of a truncated cone so that the outer diameter is linearly reduced in the distal direction. However, conicity in the sense of this invention is also understood to mean other shapes of the shaft portion in which the outer diameter is reduced from proximal to distal.

Furthermore, according to the invention, the outer diameter of the shaft is overdimensioned in a proximal zone of the coupling section compared to an inner diameter of the cylinder tube.

Thus, the end of the shaft portion of the closure part pointing towards the center of the working cylinder has an overdimensioned outer diameter compared to the inner diameter of the cylinder tube. This overdimension is reduced axially along the main longitudinal axis of the working cylinder.

The interaction of the distally reducing conicity and the overdimension relative to the inner diameter of the cylinder tube causes an expansion of the cylinder tube along the circumference when the two coupling partners are joined, i.e. when the cylinder tube is guided over the shaft portion of the closure part. According to the invention, the expansion occurs in the elastic area of the cylinder tube material. Thus, there is an elastic circumferential expansion in the proximal zone according to the invention. Viewed distally, the circumferential expansion reduces correspondingly to the reducing conicity in this direction. Preferably, the circumferential expansion is reduced as a result of the distally reducing conicity to such a degree that the circumferential expansion is reduced to zero in a distal zone. The distal zone adjoins the proximal zone in the axial distal direction. Furthermore, it is possible that the elastic circumferential expansion is only reduced. In the context of this description, the delimitation criterion between the proximal zone and the distal zone is to be understood such that the maximum elastic circumferential expansion of the distal zone is at most 50% of the maximum elastic circumferential expansion of the proximal zone. In a particularly preferred embodiment, the minimum elastic circumferential expansion of the distal zone is at most 20% of the maximum elastic circumferential expansion of the proximal zone.

Due to the increased tensile stress of the cylinder tube material along the circumference in the proximal zone, the cylinder tube nestles up to the conical shaft portion and forms a hybrid form-fit and force-fit connection. Preferably, this hybrid connection provides a sufficient connecting force between the two coupling partners on its own to cope with the tensile forces during the operation of the hydraulic cylinder.

The coupling according to the invention offers, in particular, the specific advantages described in the following.

Surprisingly, a solution has been found to provide a coupling between the cylinder tube and the relevant closure part with a high load capacity by using structurally simple means.

Advantageously, a force-fit, a form-fit and a positive-substance connection act together here and make the absorption of particularly high axial tensile forces possible.

Furthermore, it is advantageous that on the manufacturing side practically no additional effort compared to known solutions is required to realize the conicity of the shaft portion of the closure part. At the same time, any additional machining of the cylinder tube is not required.

Furthermore, a solution according to the invention was advantageously found in which the conicity can be designed in such a way that the cylinder tube end portion in the distal zone, i.e. also in the area of the laser ring weld seam, exhibits only little or no elastic circumferential expansion. This means that there is very little or no tensile stress in the circumferential direction. If axial tensile stress is caused in the area of the laser ring weld seam by high operating pressures, multi-axial stresses in the material of the cylinder tube end are avoided in this way. This aspect allows a higher axial tensile force to be absorbed under otherwise identical conditions, concerning in particular the cylinder tube thickness and weld seam formation.

Moreover, any dimensional tolerances of the inner diameter of the cylinder tube are compensated for without the need for further additional measures.

At the same time, it is advantageous that the coupling according to the invention is possible both between the cylinder tube and a bottom closure part and between the cylinder tube and a guide closure part.

According to an alternative aspect of the invention, the shaft portion has a distally increasing conicity. A distally increasing conicity is understood to mean that the outer diameter of the shaft increases in an axially eccentric direction. Thus, the shaft portion is inserted into the cylinder tube end portion with its portion having the tapered outer diameter being ahead.

According to this aspect of the invention, there is a particular advantage of easier assembly, since the centric positioning of the closure part relative to the cylinder tube and thus the joining of the coupling partners is facilitated. With this design, any dimensional tolerances of the inner diameter of the cylinder tube are also compensated for without the need for further additional measures.

According to an advantageous further development, the working cylinder is characterized in that the closure part has an axial closure part ring surface and the cylinder tube has an axial cylinder tube ring surface. The two ring surfaces also form a common ring contact surface. The ring weld seam is provided radially at the ring contact surface. The cylinder tube and the closure part are welded at the contact surface. The pressure resistance and pressure tightness are achieved thanks to the positive-substance connection.

Advantageously, the cylinder tube ring surface and the axial closure part ring surface form an axial stop when they are joined so that the positional relationship between the coupling partners is axially fixed in a reliable manner even before welding. In this way, it is also possible to provide a compressive preload before or during welding.

According to another advantageous further development, the working cylinder is characterized in that the conicity of the shaft portion has a conicity angle alpha, wherein the value of alpha ranges between 0.1 and 1 degree relative to the main longitudinal axis.

The angle alpha forms an undercut in the pull-off direction. The undercut is used for a form-fit connection to a corresponding joining partner. A permanent cohesion of the joining partners is reached by this form-fit connection. Due to the undercut, the joining force is lower than the pull-off force.

It was found that with a conicity angle alpha ranging from 0.1 to 1 degree, both an advantageous degree of elastic circumferential expansion of the cylinder tube end portion in the proximal zone and, at the same time, little or no elastic circumferential expansion of the cylinder tube end portion in the distal zone can be achieved. This simultaneously enables a force-fit and form-fit coupling with a high load capacity and the avoidance of multi-axial material stresses in the area of the ring weld seam.

According to another advantageous further development, the working cylinder is characterized in that the elastic circumferential expansion of the cylinder tube in the proximal zone ranges between 0.02% and 0.5%.

The circumferential expansion in this area is within the elastic range for the steel used, under the limit to the plastic range. Thus, a force is built up during joining due to the resulting circumferential stress, which supports the form-fit connection to the angular closure part.

According to a next advantageous further development, the working cylinder is characterized in that the closure part has a higher modulus of elasticity than the cylinder tube.

The combination of the angle alpha on the closure part with the inner diameter of the cylinder tube and its circumferential expansion requires a specific material pairing. The closure part shall have an appropriate hardness so that the conical shaft portion survives the joining process in order to ensure the undercut even after the joining process. In contrast, the cylinder tube must expand sufficiently to nestle up to the undercut. The result is the form-fit connection. Therefore, the two coupling partners preferably have different material hardnesses and elasticities.

According to a further advantageous development, the working cylinder is characterized in that the closure part has a closure part inlet chamfer or the cylinder tube has a cylinder tube inlet chamfer.

For a simple joining process, so that the two coupling partners find each other in the correct position, the closure part is provided with an outer chamfer and, alternatively or cumulatively, the cylinder tube is provided with an inner chamfer.

In addition, the sliding of the two chamfers against one another supports the expansion process of the cylinder tube.

According to a further advantageous development, the working cylinder is characterized in that the cylinder tube ring surface has an inclination angle beta, and the value of beta ranges between 0.1 and 1 degree.

According to this further development, the inclination angle beta preferably corresponds to the conicity angle alpha. This further development is based on the fact that, in a sectional view, the cylinder tube adjoins the shaft portion of the closure part at the conicity angle alpha as a result of the elastic circumferential expansion in the proximal zone. Thus, the axial cylinder tube ring surface also inclines at this angle. As a result, it would form a wedge-shaped gap widening in a radially centric direction relative to an axial closure part ring surface arranged orthogonally to a main longitudinal axis. In the further development presented here, the angle is corrected and a plane parallelism between the axial cylinder tube ring surface and the axial closure part ring surface is created, and thus a high-rigid and sealing laser ring weld seam is made possible.

BRIEF DESCRIPTION OF THE FIGURES

The invention is described as an embodiment in more detail by means of the following figures. They show.

DETAILED DESCRIPTION OF THE INVENTION

Figure 1:
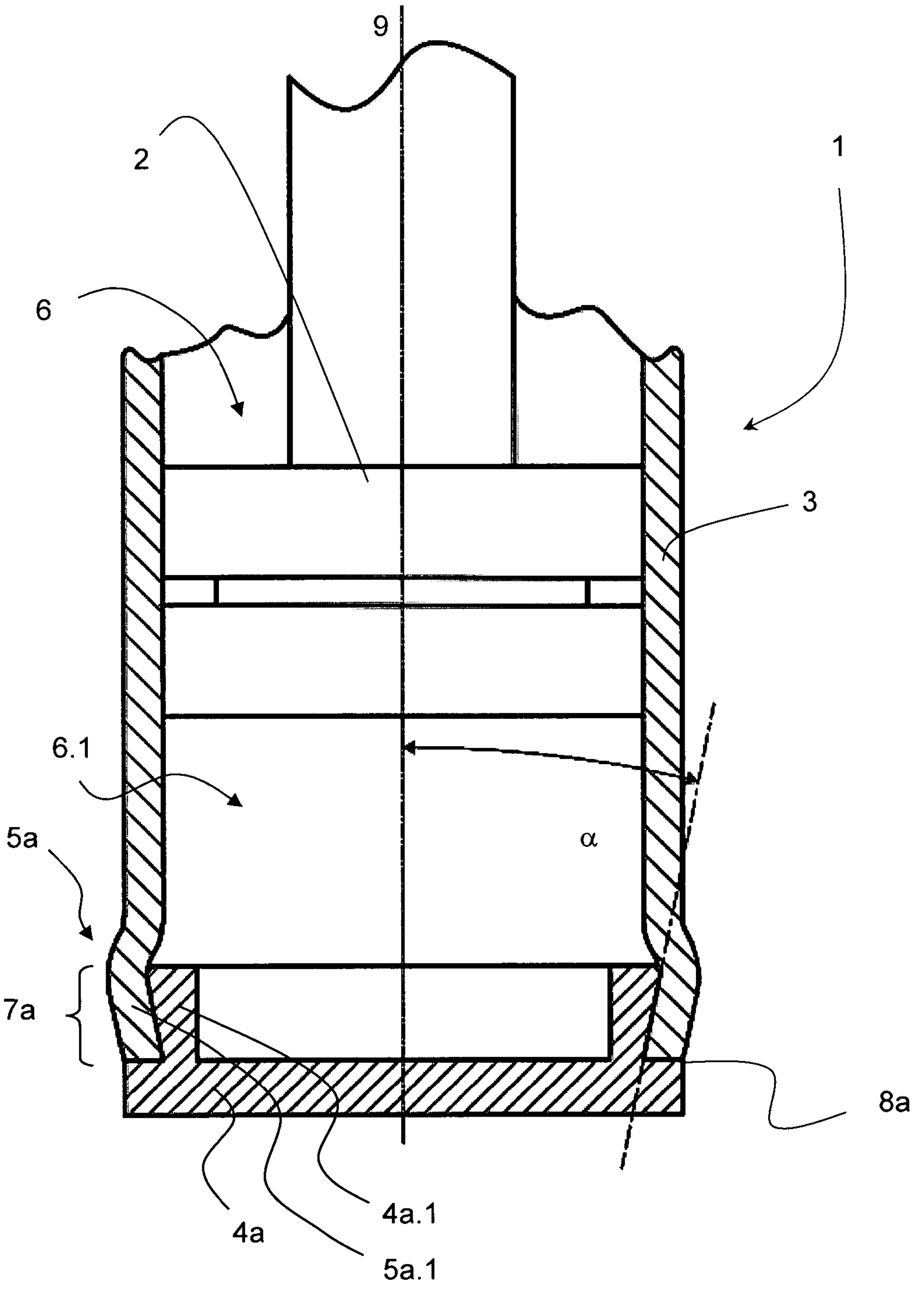
FIG. 1 a schematic sectional view of a working cylinder with an overdimensioned representation of the conicity angle with distally reducing conicity FIG. 2 an enlarged section of a coupling section with an overdimensioned representation of the conicity angle FIG. 3 a sectional view of a working cylinder and an enlarged section FIG. 4 a sectional view of a working cylinder with distally increasing conicity and an enlarged section FIG. 5 a sectional view of a working cylinder with the representation of a further coupling section.

Here, the same reference numerals in the various figures refer to the same features or components. The reference numerals are also used in the description if they are not shown in the relevant figure.

FIG. 1 shows a schematic sectional view of one end of a working cylinder 1.

The working cylinder 1 comprises the piston unit 2, the cylinder tube 3 and the closing part 4*a*. The cylinder tube 3 has two openings, one of which is closed with the closure part 4*a* and the second is closed with the further closure part 4*b*.

In the completely assembled working cylinder 1, the piston unit 2 passes in a sliding manner through the further closure part 4*b*. In this exemplary embodiment, the piston unit 2 is designed in two parts and consists of the piston rod and the piston. The piston unit 2 moves in the cylinder interior 6 and forms the working chamber 6.1 there.

The closure part 4*a* is arranged at the cylinder tube end 5*a*.

To assemble the working cylinder 1, the cylinder tube 3 is pushed onto the closure part 4*a*. In this process, a joining path is overcome in a force-driven manner. For this purpose, the closure part 4*a* and the cylinder tube 3 are brought into contact with the closure inlet chamfer 4*a*.3 and the cylinder tube inlet chamfer 5*a*.3. The chamfers are used for a more precise positioning of the coupling partners 4*a*, 3 relative to each other. During an axial joining movement, the cylinder tube end portion 5*a*.1 slides over the shaft portion 4*a*. 1 of the closure part 4*a*. During this sliding process, the cylinder tube end portion 5*a*.1 is elastically expanded and nestles around the shaft portion 4*a*.1 of the closure part 4*a*, wherein the shaft portion is expanded by the conicity angle α in the distal direction and, thus, it has an overdimension in the proximal zone 7*a*.1 compared to the inner diameter of the cylinder tube 3. And the cylinder tube end portion 5*a*.1 is expanded in the proximal zone 7*a*.1 in the coupling section 7*a*.

The expansion provides a form-fit connection between the coupling partners 4*a*, 3 that is also effective in the axial direction. The form-fit connection interacts with the also axially acting force-fit connection due to the static friction between the inner lateral surface of the cylinder tube 3 in the area of the cylinder tube end portion 5*a*.1 and the conical outer lateral surface of the shaft portion 4*a*.1 of the closure part 4*a*.

The two joining partners are joined with the aid of force until the cylinder tube ring surface 5*a*.2 rests on the closure part ring surface 4*a*.2. The two ring surfaces 4*a*.2, 5*a*.2 are the respective end surfaces of the joining partners perpendicular to the main longitudinal axis 9 in the axial direction. The joining process is completed when the two ring surfaces 4*a*.2, 5*a*.2 are in contact with each other.

A ring weld seam 8*a* is provided along the circumference of the cylinder tube 3 at the level of the ring surfaces 4*a*.2, 5*a*.2 and perpendicular to the main longitudinal axis 9 in order to close the cylinder 1 in a positive-substance and pressure-tight manner.

Figure 2:
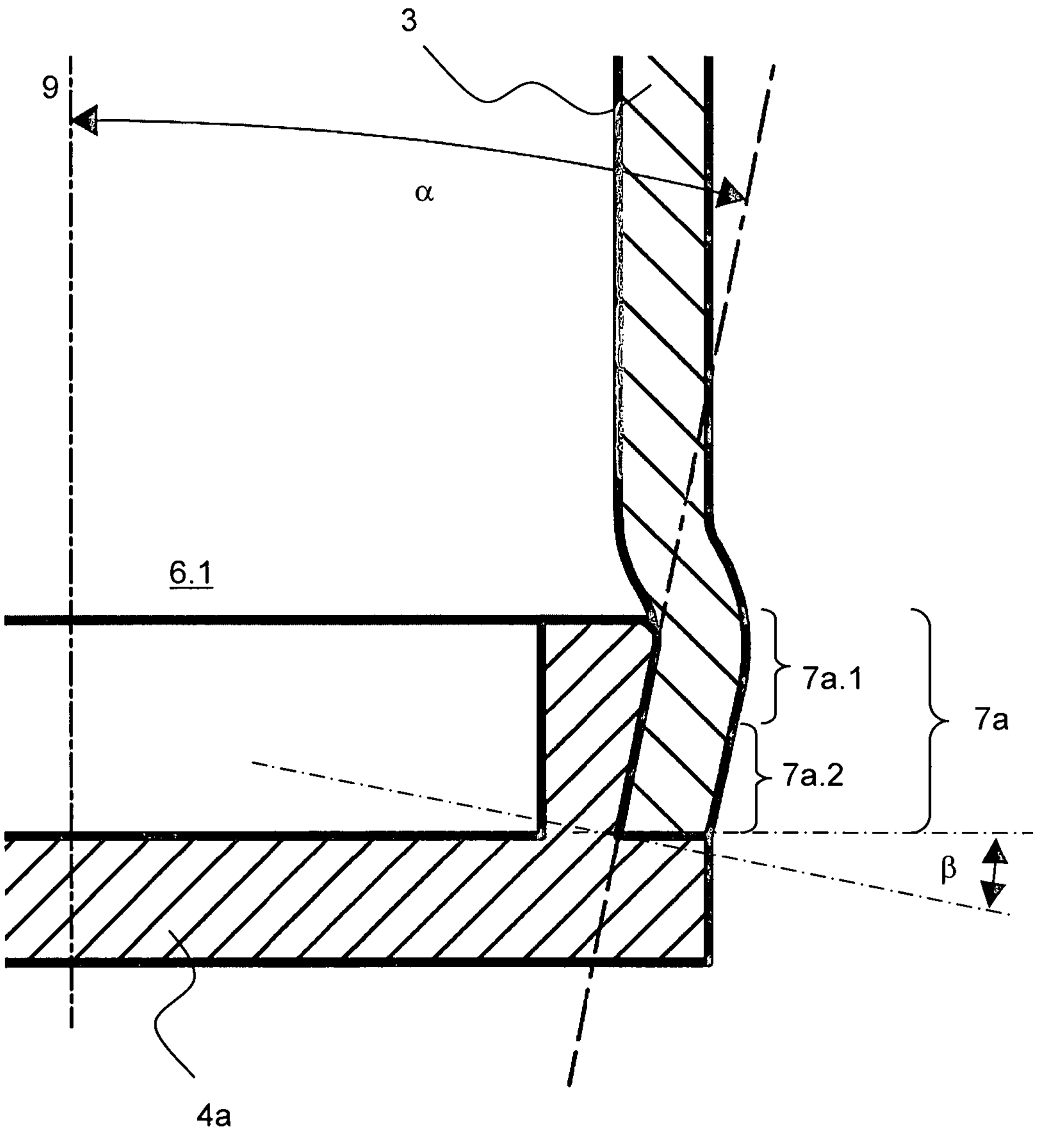

FIG. 2 shows an enlarged section of FIG. 1, in which the conicity angle alpha is also shown in a multi-overdimensioned representation. In this exemplary embodiment, the conicity angle alpha is 0.2 degrees. The conicity in the proximal section **7*a*.1 of the coupling section 7*a* provides an overdimension of the outer diameter of the shaft portion 4*a*.1 compared to the inner diameter of the cylinder tube 3. As a result of this overdimension, the cylinder tube 3 exhibits an elastic circumferential expansion in the cylinder tube end portion 5*a*.1, which decreases towards the distal direction. The geometry of the conicity is designed such that in the distal zone 7*a*.2 at the base of the shaft portion 4*a*.1, there is no overdimension compared to the internal diameter of the cylinder tube 3 so that an elastic circumferential expansion of the cylinder tube 3 does not exist in the distal zone of the coupling section 7*a***.

Furthermore, FIG. 2 shows the inclination angle beta of the cylinder tube ring surface **5*a*.2 provided in the exemplary embodiment. In the exemplary embodiment, the inclination angle beta is 0.2 degrees and corresponds to the value of the conicity angle alpha in this embodiment. The inclination angle beta compensates for the inclined position of the cylinder tube wall caused by the unequal and distally reducing elastic circumferential expansion over the shaft portion 4*a*.1. Thus, the cylinder tube ring surface 5*a*.2 lies exactly flat on the closure part ring surface 4*a*.2 so that a ring weld seam 8*a* with high load capacity can be provided there as a laser ring weld seam over the entire weld seam depth. At the same time, the laser ring weld seam is not subject to any tensile stress acting over the circumference in the material of the cylinder tube 3**.

Figure 3:
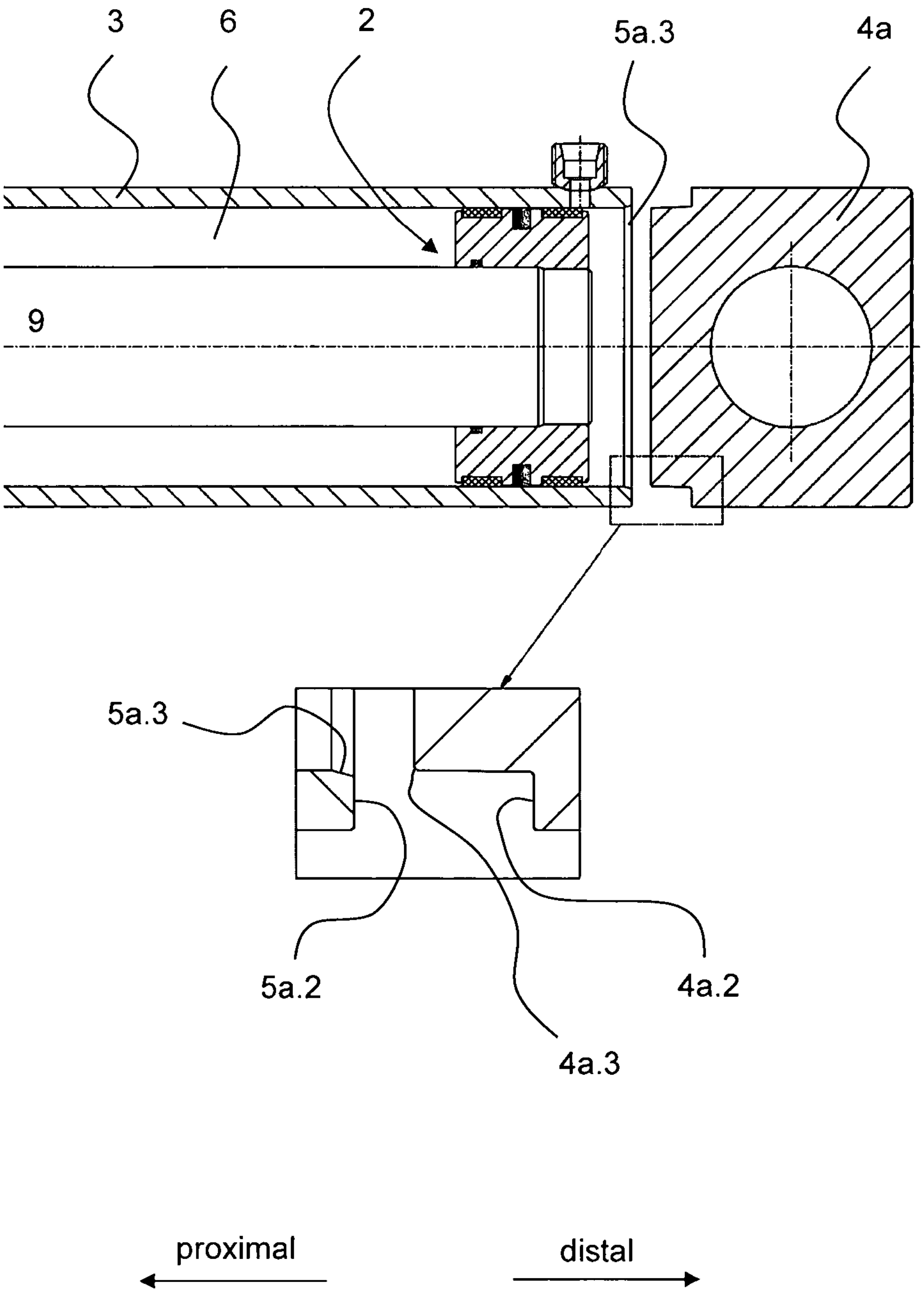

FIG. 3 also shows a sectional view without an overdimensioned representation of the conicity angle alpha so that the conical shaft portion of the closure part **4*a*** appears to be substantially cylindrical.

In the representation according to FIG. 3, the cylinder tube 3 and the closure part **4*a* have not been coupled yet so that the shaft portion 4*a*1 has not been inserted yet into the cylinder tube 3 in the cylinder tube end portion 5*a*1. FIG. 3 particularly shows the arrangement and positional relationships of the closure part ring surface 4*a*.2 and the cylinder tube ring surface 5*a*.2 as well as of the closure part inlet chamfer 4*a*.3 and the cylinder tube inlet chamfer 5*a*.3**.

Figure 4:
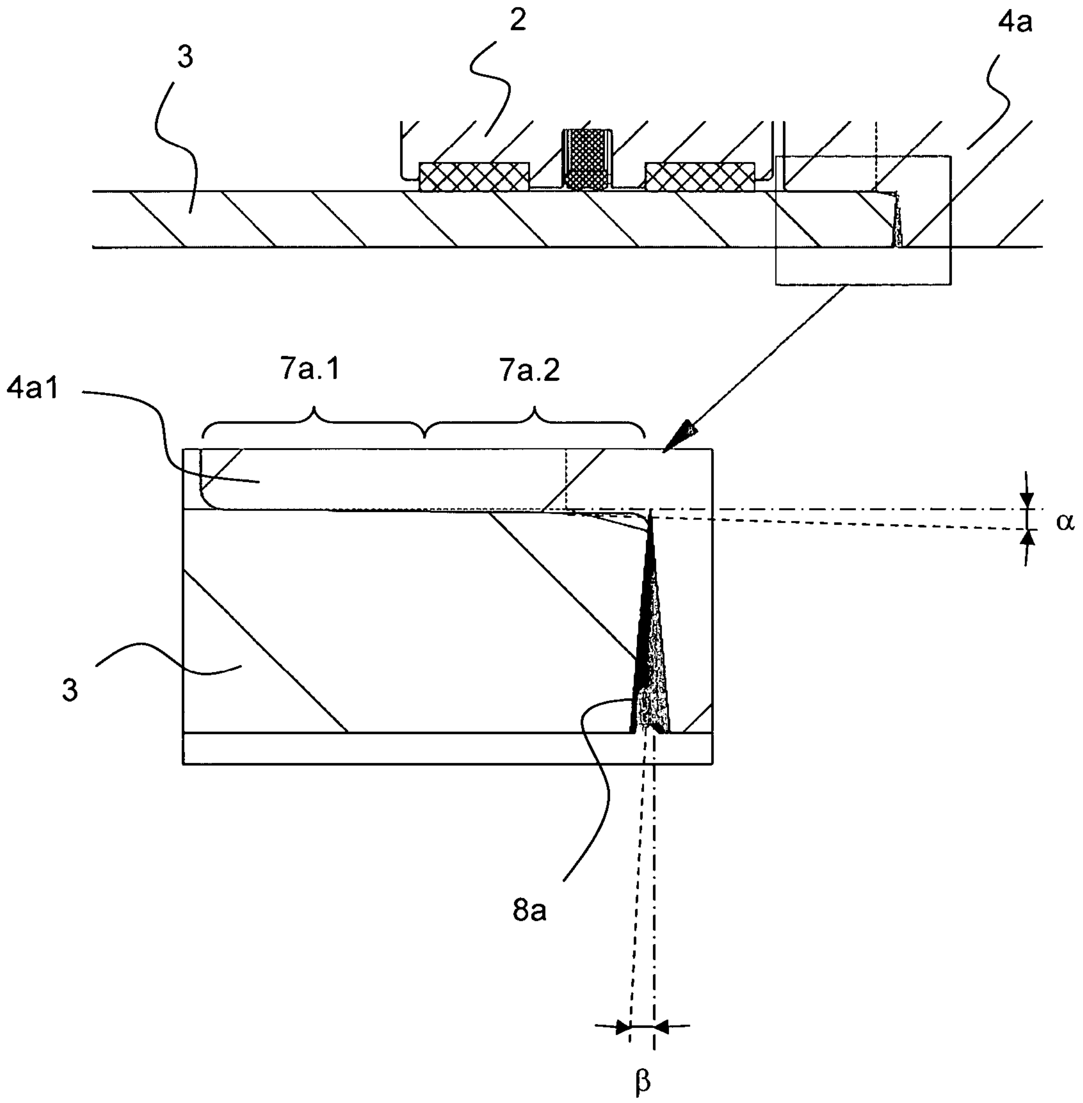

FIG. 4 shows an exemplary embodiment with a distally increasing conicity of the shaft portion **4*a*1. Here, the tapered outer diameter is given in the proximal zone 7*a*. 1 and the increased outer diameter of the shaft is given in the distal zone 7*a*.2. Accordingly, the conicity angle alpha is expanded in the opposite direction compared to the exemplary embodiment shown in FIGS. 1 and 2. With a cylinder tube 3 exactly orthogonally cut to length, the inclination angle beta opens outwards due to the elastic expansion of the cylinder tube 3 so that the deep penetration of a laser steel into the butt joint between the closure part ring surface 4*a*.2 and the cylinder tube ring surface 5*a*.2 is supported during welding and a ring weld seam 8*a*** with a particularly high load capacity can be produced.

Figure 5:
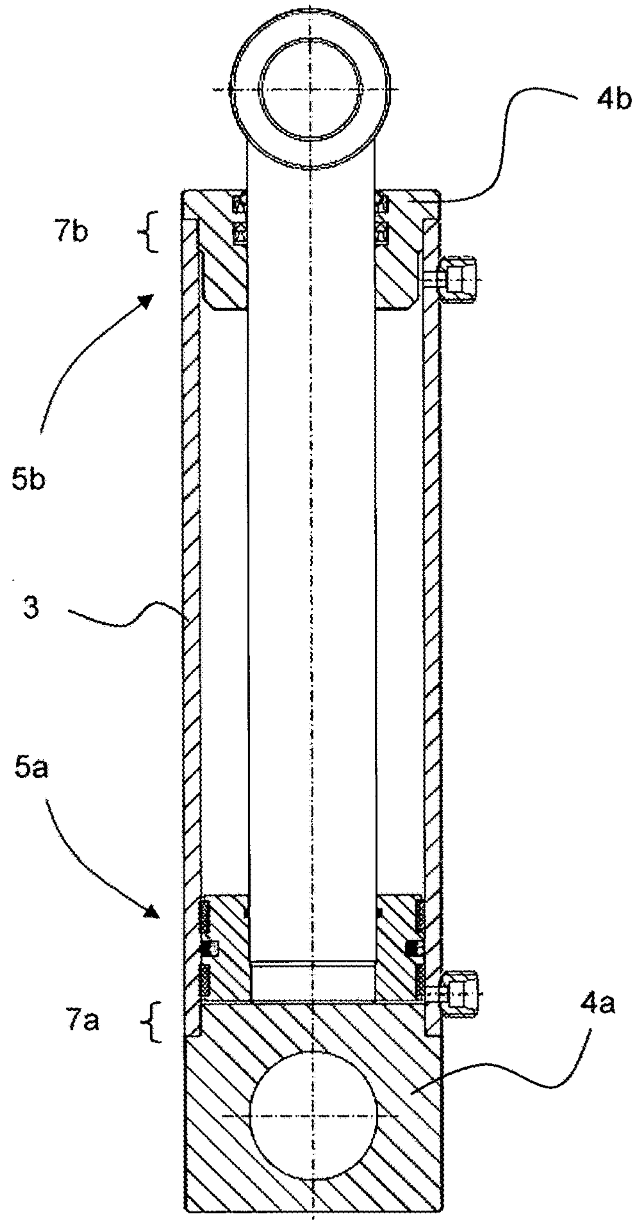

FIG. 5 shows an exemplary embodiment of a working cylinder in which the closure parts **4*a*, 4*b* are coupled to both cylinder tube ends 5*a*, 5*b* according to the invention. In addition to the coupling section 7*a* at the cylinder tube end 5*a* to the closure part 4*a* already shown in the other figures, in this exemplary embodiment the further closure part 4*b*, here designed as a guide closure part, is additionally coupled to the cylinder tube 3 in a further coupling section 7*b* at the further cylinder tube end 5*b*. The further coupling section 7*b* is designed in the same way as the coupling section 7*a* so that the description parts for the coupling section 7*a* also apply accordingly to the further coupling section 7*b***.

REFERENCE NUMERALS

1 cylinder
2 piston unit
3 cylinder tube
**4*a*** closure part
**4*a*.1** shaft portion
**4*a*.2** closure part ring surface
**4*a*.3** closure part inlet chamfer
**4*b*** further closure part
**5*a*** cylinder tube end
**5*a*.1** cylinder tube end portion
**5*a*.2** cylinder tube ring surface
**5*a*.3** cylinder tube inlet chamfer
**5*b*** further cylinder tube end
6 cylinder interior
6.1 working chamber
**7*a*** coupling section
**7*a*.1** proximal zone
**7*a*.2** distal zone
**7*b*** further coupling section
**8*a*** ring weld seam
9 main longitudinal axis
α conicity angle alpha
β inclination angle beta

The invention claimed is:

1. A working cylinder, comprising:

a cylinder having a cylinder tube, a closure part and a further closure part, said cylinder tube with said closure parts defining a cylinder interior, said cylinder tube having a cylinder tube end and a further cylinder tube end, said closure part being provided at said cylinder tube end and said further closure part being provided at said further cylinder tube end;

a piston unit defining at least one working chamber in said cylinder interior;

said closure part having an axial closure part ring surface with a shaft portion extending therefrom, said shaft portion having a base end at said ring surface and a free end opposite said base end and said cylinder tube having a cylinder tube end portion, said shaft portion and said cylinder tube end portion defining a coupling section with a proximal zone and a distal zone and in said coupling section said closure part is axially inserted with said shaft portion into said cylinder tube at said cylinder tube end portion, said shaft portion having a conicity with a greatest shaft diameter at said free end, said shaft portion having, at least in sections of the conicity, an overdimension relative to an inner diameter of said cylinder tube, and said cylinder tube having an elastic circumferential expansion at said cylinder tube end portion, said coupling section being configured for coupling said closure part and said cylinder tube in an axially force-fit and form-fit, said cylinder tube end being connected to said closure part in a positive-substance manner by a circumferential ring weld seam, said ring weld seam being a laser weld seam defining a pressure medium-tight sealing plane.

2. The working cylinder according to claim 1, wherein said cylinder tube has an axial cylinder tube ring surface, said ring surfaces define a common contact ring surface, said ring weld seam is provided radially on said contact ring surface.

3. The working cylinder according to claim 2, wherein said cylinder tube ring surface has an inclination angle that ranges between 0.1 and 1 degree.

4. The working cylinder according to claim 1, wherein the elastic circumferential expansion of said cylinder tube in said proximal zone is 0.02% to 0.5%.

5. The working cylinder according to claim 1, wherein said closure part has a higher modulus of elasticity than said cylinder tube.

6. The working cylinder according to claim 1, wherein said closure part has a closure part inlet chamfer or said cylinder tube has a cylinder tube inlet chamfer.

7. The working cylinder according to claim 1, wherein the conicity of said shaft portion has a conicity angle that ranges between 0.1 and 1 degree relative to a main longitudinal axis of said cylinder tube.

8. A working cylinder, comprising:

a cylinder having a cylinder tube, a closure part and a further closure part, said cylinder tube with said closure parts defining a cylinder interior, said cylinder tube having a cylinder tube end and a further cylinder tube end, said closure part being provided at said cylinder tube end and said further closure part being provided at said further cylinder tube end;

a piston unit defining at least one working chamber in said cylinder interior, said closure part having a shaft portion and said cylinder tube having a cylinder tube end portion, said shaft portion and said cylinder tube end portion defining a coupling section with a proximal zone and a distal zone and in said coupling section said closure part being axially inserted with said shaft portion into said cylinder tube at said cylinder tube end portion, said shaft portion having a conicity, the conicity being configured to increase distally, said shaft portion being overdimensioned along the conicity relative to said inner diameter of said cylinder tube in said distal zone of said coupling section with a maximum overdimension occurring in said distal zone, and said cylinder tube having an elastic circumferential expansion in said distal zone;

said coupling section being configured for coupling said closure part and said cylinder tube in an axially force-fit and form-fit, said cylinder tube end being connected to said closure part in a positive-substance manner by a circumferential ring weld seam, said ring weld seam being a laser weld seam defining a pressure medium-tight sealing plane.

* * * * *